July 16, 1946.     W. F. ALLER     2,403,896
GAUGING DEVICE
Filed Sept. 13, 1943

INVENTOR.
W. F. Aller
BY
Edward T. Noe
ATTORNEY.

Patented July 16, 1946

2,403,896

UNITED STATES PATENT OFFICE 2,403,896

GAUGING DEVICE

Willis Fay Aller, Dayton, Ohio, assignor to The Sheffield Corporation, Dayton, Ohio, a corporation of Ohio Application September 13, 1943, Serial No. 502,130

2 Claims. (Cl. 33—147)

This invention relates to gauges and more particularly to high precision gauges capable of very accurate measurements.

One object of the invention is the provision of a gauging device having a work engaging member and means operable in response to the position of the gauging member, in which the gauging member may be readily lifted from the work position without applying any manual force to the portion of the support carrying the work engaging member.

Another object is the provision of a gauging device of the character mentioned, having electromagnetic means carried by the support and adapted to be energized to lift the work engaging member.

Other objects and advantages of the invention will be apparent from the following description, the appended claims and the accompanying drawing, in which, Fig. 1 is a central vertical section showing a gauging device embodying the present invention;

Figure 2:
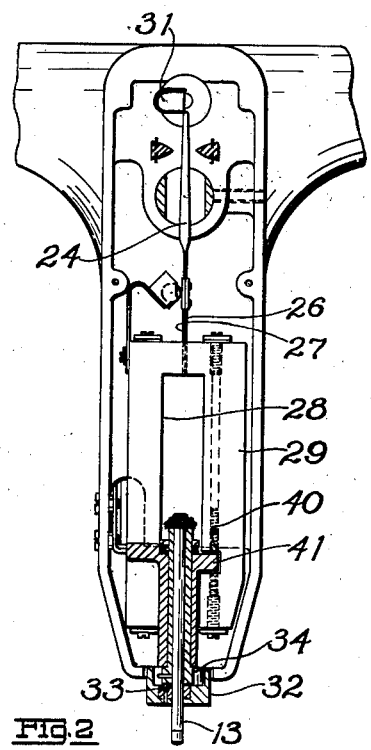
Fig. 2 is a section on the line 2—2 of Fig. 1.
Figure 1:
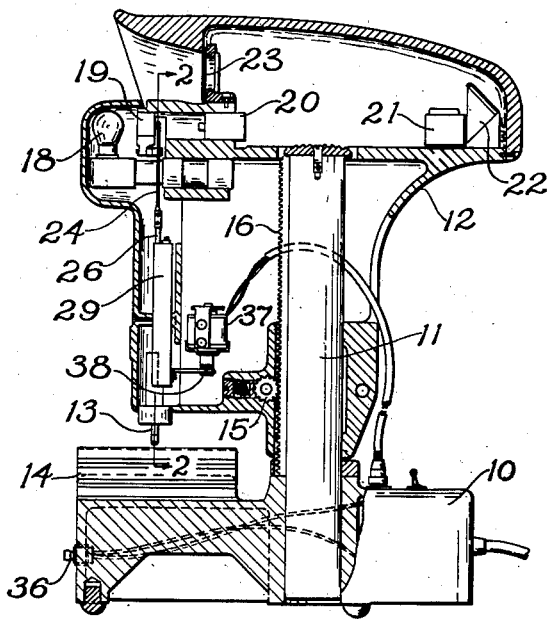

Referring more particularly to the drawing, in which the same reference numerals have been applied to corresponding parts in the several views, 10 designates a base, carrying a vertical standard 11 on which a support 12 is arranged for vertical movement, these parts constituting a gauging device having a work engaging member 13 which is operated by work pieces applied to the anvil 14 on the base.

The support 12 can be readily raised or lowered on the standard 11 by rotating a gear 15 rotatably mounted on the support and engaging rack teeth 16 on the standard. Suitable indicating or operating mechanism is arranged in the support 12, responsive to the movements of the work engaging member 13. While any suitable mechanism may be used to give accurate highly amplified movements, as herein shown the gauging apparatus embodies a source of light 18, lens assemblies 19, 20 and 21, prism 22 and a scale 23. An indication is given on the scale, as a shadow line representing, to an amplified degree, the position of a pointer or target 24 which intersects the light rays. The pointer 24 can move towards the right or left as viewed in Fig. 2. At its lower end it is fixed to two parallel spring blades 26 and 27 the lower ends of which are fixed to two adjacent carriers or blocks 28 and 29. Block 29 is fixed to the support 12 and carries the block 28 for vertical parallel movement by means of two spaced horizontal spring blades secured at opposite ends to the two blocks. The movable block 28 supports the work engaging member 13. As will be apparent, rectilinear movement of the member 13 by the work produces a corresponding movement of the block 28 and this causes an amplified movement of the pointer 24. The target at the upper end of the pointer, and the optical system in which this target is arranged gives a still further amplified movement apparent as a shadow line on the scale 23.

Suitable means is provided to give a fine adjustment in the relative positions of the work engaging member 13 and block 28. This means may take the form of a cam adjustment, and as shown, a disc 32 is fixed to the work engaging member and is provided with a ball 33 which operates against the inclined lower surface of a cam 34 fixed in the lower portion of the block 28.

Figure 3:
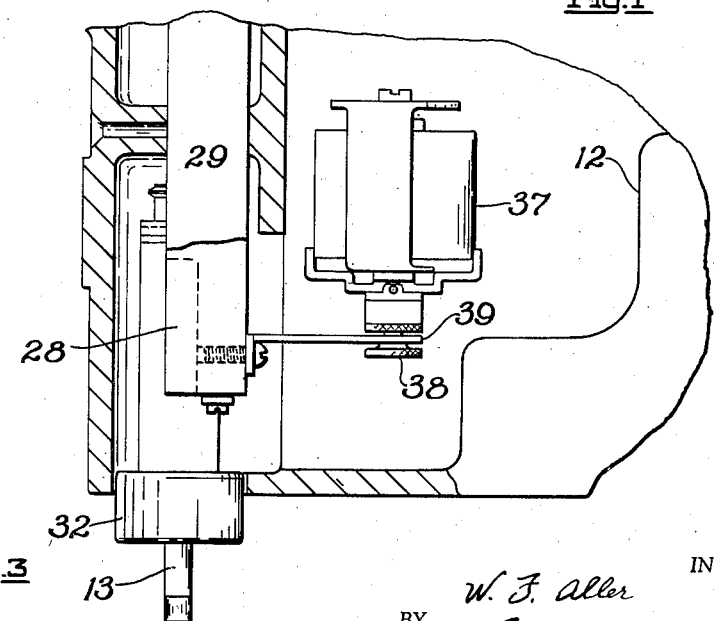
Fig. 3 shows the lower portion of Fig. 2 on an enlarged scale.

In gauging devices which have a very high amplification factor so as to give a very sensitive and accurate indication of the size of workpieces the pressure that the operator could apply even by resting his hand on the support 12 in order to manually operate the work engaging member to lift it from the work before he applies the work to the anvil may be sufficient to produce some small error in the reading obtained. While the support 12 and the standard 11 may be of rugged construction, nevertheless only a very slight bending can produce a very noticeable error in a gauging device which is capable of measuring, for example, to an accuracy of the order of one-one hundred thousandth of an inch. With high precision gauges it is highly desirable to raise the work engaging member from the work before applying the work in order to avoid wear and error. In order to raise and lower the work engaging member with a uniform lifting and lowering action and without applying any bending or flexing movement to that part of the gauge which carries the operating mechanism, in accordance with the present invention, the lifting acting is effected by an electromagnetic means carried by the support 12 and adapted to be energized by the operator merely by pushing a switch carried in the base 10. This switch, shown at 36 is preferably of the push button type which completes a circuit so long as the switch is held closed. The switch is connected in series with the solenoid and to a suitable transformer arranged in the base. The solenoid has a plunger or armature 38, shown in Fig. 3 in its lowered position. The plunger 38 extends with suitable clearance through a hole in the arm 39 which projects from and is fixed to the movable block 28. The block 28 is shown in Figs. 2 and 3 in a zero position in which the indication will be at the center of the scale, corresponding to a normal position for gauging work of the correct size, the gauge having been previously set by a suitable master. With no work in place a spring 40 in the block 29 pushes downwardly on a projection 41 of the movable block, this projection operating with only limited movement in a groove or slot in the fixed block 29 so that the lowered position of the work engaging member is determined by engagement of the part 41 with the lower portion of this slot. In this lowered position of the work engaging member, the bracket 39 has a slight clearance from the boss on the lower end of the solenoid plunger. When the solenoid is energized the boss 38 engages the arm 39 and moves it upwardly, applying a uniform force to it each time the solenoid is energized, and bringing the movable block to its upper position determined by the projection 41 and the groove in which it operates. The work then may be applied, and the switch 36 released to deenergize the solenoid, and the solenoid plunger then falls, permitting the spring 40 to press the movable block downwardly with a uniform force, and without applying bending or flexing force to the support 12 that would tend to create an error in the reading obtained. When the solenoid is deenergized, the arm 39 is entirely free of any connection with the solenoid plunger since there is sufficient lost motion between the upper and lower sides of the arm 39 and the adjacent portions of the solenoid plunger. As will be apparent, those errors that would be created by the application of a manual force to a lever system or other manually operable mechanism on the support 12 are entirely avoided.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauging device comprising a support, a work supporting base, a work engaging member having an arm rigid therewith, means mounting said member on said support for rectilinear movement towards and from a work position, electromagnetic means carried by said support and including a movable armature operable rectilinearly in a path parallel to the direction of movement of the work engaging member, said armature and arm having portions normally spaced apart and adapted for abutting operation to lift said arm by said armature, and a switch adapted for direct manual operation and carried by said base at a point removed from the work position to energize said armature and thus retract said work engaging member.

2. A gauging device comprising a base, a support adjustably mounted on said base, a movable block, a work engaging member carried by said block, spring means supporting said block on said support for rectilinear movement towards and from a work position, a solenoid carried by said support and having a movable armature operable rectilinearly in a path parallel to the direction of movement of the work engaging member, an arm rigid with said movable block and having a direct lost motion connection to the armature of said solenoid, and a switch carried by said base at a point removed from the work position and adapted for manual operation to energize and deenergize said solenoid and thus raise and lower the work engaging member.

WILLIS FAY ALLER.